(12) United States Patent
Mushiage

(10) Patent No.: US 7,421,187 B2
(45) Date of Patent: Sep. 2, 2008

(54) REPRODUCING APPARATUS AND SUPERIMPOSING METHOD

(75) Inventor: Tomohiro Mushiage, Kanagawa (JP)

(73) Assignee: Sony Corporation, Tokyo (JP)

( * ) Notice: Subject to any disclaimer, the term of this patent is extended or adjusted under 35 U.S.C. 154(b) by 392 days.

(21) Appl. No.: 11/228,804

(22) Filed: Sep. 16, 2005

(65) Prior Publication Data

US 2006/0008246 A1 Jan. 12, 2006

Related U.S. Application Data

(63) Continuation of application No. 09/766,474, filed on Jan. 19, 2001, now Pat. No. 6,985,671.

(30) Foreign Application Priority Data

Jan. 20, 2000 (JP) ............................. 2000-011972
Mar. 30, 2000 (JP) ............................. 2000-094611

(51) Int. Cl.
*H04N 5/91* (2006.01)

(52) U.S. Cl. .............................. 386/46; 386/52; 386/95
(58) Field of Classification Search ................. 386/46, 386/95, 98, 125, 126, 52
See application file for complete search history.

(56) References Cited

U.S. PATENT DOCUMENTS

| 5,729,651 A | 3/1998 | Matsumoto ................. 386/95 |
| 6,272,279 B1 | 8/2001 | Yokoyama et al. ............ 386/52 |
| 6,801,708 B1 | 10/2004 | Takahashi et al. ............ 386/52 |
| 2002/0035620 A1 | 3/2002 | Takahashi et al. ........... 709/220 |

*Primary Examiner*—Huy T Nguyen
(74) *Attorney, Agent, or Firm*—Frommer Lawrence & Co. Haug LLP; William S. Frommer; Thomas F. Presson

(57) ABSTRACT

In an AV server system, it is facilitated to grasp the entire structure of an AV server and determine which position a failed resource assumes in the entire AV server. On the basis of a file which describes resources of the AV server, resources forming the AV server are displayed in a hierarchical form on a screen. When a fault has occurred in any resource, the range from the highest class down to the class to which the failed resource belongs is displayed on one picture.

4 Claims, 13 Drawing Sheets

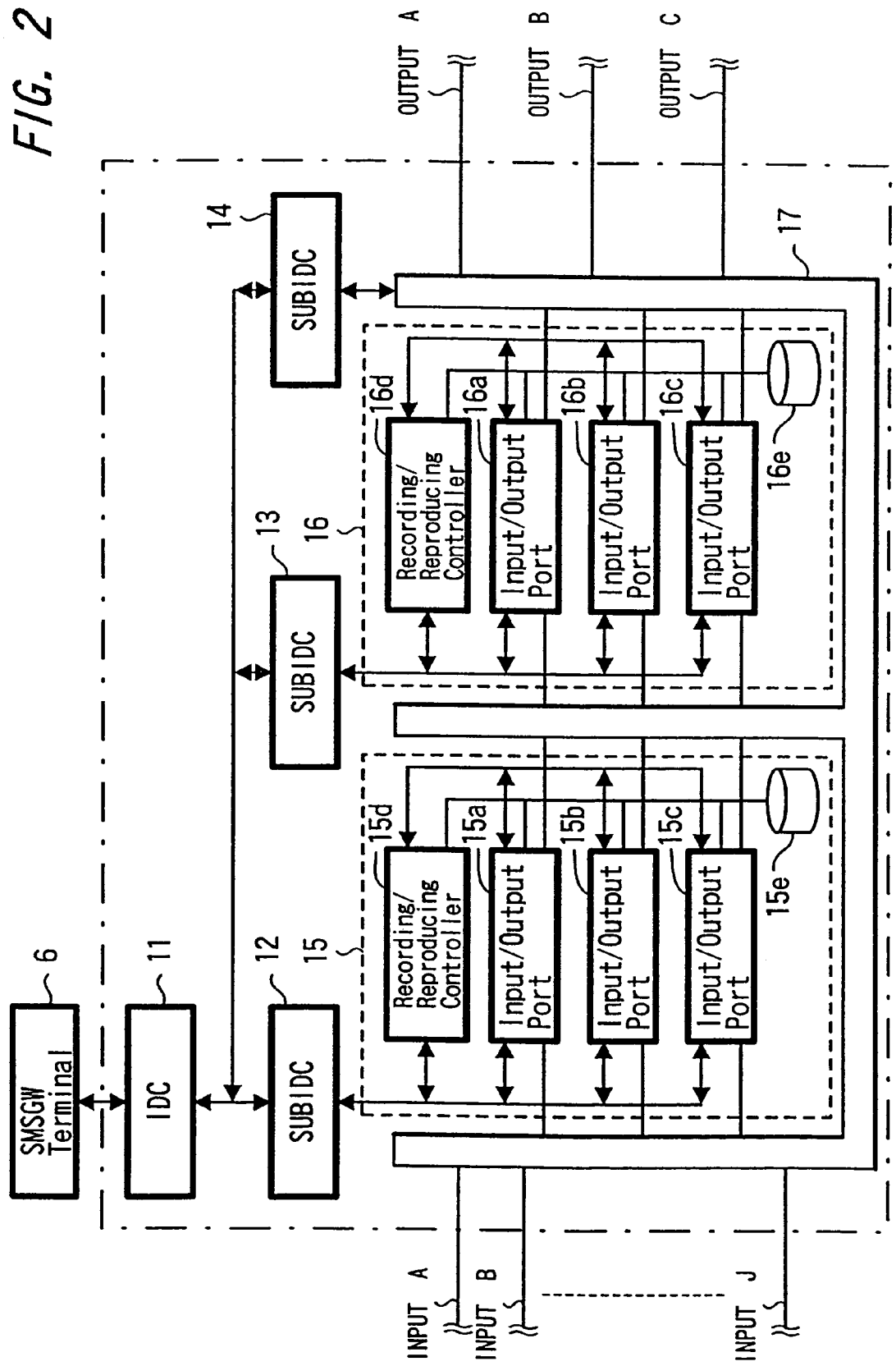

FIG. 3

Details of Server Material Data                    Editing Version  0

Program Code            0000000
Program Name
Subtitle
                        Sound Version  CH1   512  511          512  511 Icon
                                              [J] ↓                 [↓]  ← 513
                                              CH2                        ← 514
Recording Date          1997/01/31   515 Start Time  14:02:00   516 End Time  14:23:00 ← 517
Recording Material Length  00:01:00   518   STC:   ○ RefTC                    
SOM Point               00:00:03:00   521                ● Preset (00:00:00:00)  519  520
Recording Resource      B31 [↓]  523  EOM Point  00:00:03:00  522
                             524
Sound Mode              ch1&ch2 [↓]            ch3&ch4 [↓]  525
Recording Method        ○ Manual        ● Automatic  526
Time Differential Flag  ○ Time Differential Sending  ● No Time Differential  527
Editing                 ○ Necessary  ● Unnecessary ○ Completed  528
Sending Date            ___/___/___  __:__        ___/___/___  __:__
                         Start Time                End Time                              530
Remarks                                                                                    ← 534
Scheduled Deletion Date 1999/12/31  23:00  531                              Broadcast      Update
Material File Name      MAIN  A VOL1:1234567       B VOL2:2345678(Error)   Material Length  ← 535
                        SUB   A VOL5:0987654       B VOL9:9876543            __:__          Close
Detailed Contents of Error  [                                                          ] [◄►]
                                    533
529

FIG. 4

Details of Sending Data

| | | | Editing Version [0] |
|---|---|---|---|
| Program Code | 0000000 | | |
| Program Name | | | |
| Subtitle | | | |
| Sending Date | 1998/09/11 | Sound Version CH1 [J▼] CH2 [▼] | |
| Sending Length | 00:01:05 | Material Length 00:01:10 | |
| SOM Point | 00:00:00:00 | Start Time [ : : ] End Time [ : : ] | |
| Sound Mode | ch1&ch2 [▼] | EOM Point 00:01:05:00 [▼] | |
| Time Differential Flag | No Time Differential | ch3&ch4 | |
| Editing Scheduled Deletion Date | Unnecessary 1999/12/31 | | |
| Material File Name | MAIN A VOL1:1234567 SUB A VOL5:0987654 | B VOL2:2345678(Error) B VOL9:9876543 | |
| Detailed Contents of Error | | | |

[Insert]  [Close]

FIG. 8A (RESOURCE SMS)

| #Res Name | Res Type(*.SMS) | Res ID | Gp Name | Init Status |
|---|---|---|---|---|
| SMS_1 | SMS | 1 | GP_MTPSER | ENABLE |
| IDC_1 | IDCMAIN | 2 | GP_IDC | ENABLE |

(Omission)

FIG. 8B (SMS File)

- Example of IDCMAIN.SMS

| #Res id | Dev id | IDC Type | Distance(Near/Far) |
|---|---|---|---|
| 2 | 1.1.0.0 | ROOT | NEAR |

; (Omission)

- Example of IDCIF.SMS

| #Res id | Dev id | Res Name | IF id | If Type |
|---|---|---|---|---|
| 10 | 1.3.1.0 | IDC_3 | 1 | GPI |

; (Omission)

; (Omission)

FIG. 9

```
siu-80 root idc(1){ builtIn AFS(1){ timer       triggerOut(1)  {AUT=30;} userActive  triggerOut(5)  {AUT=29;}

(Omission)

sub idc(15){ vpack if(1){ all vsbus( 1)  {address=0x22; add=TRUE;} all vsbus( 2)  {address=0x24; add=TRUE;} all vsbus( 3)  {address=0x26; add=TRUE;}

}

}
```

REPRODUCING APPARATUS AND SUPERIMPOSING METHOD

This is a continuation of application Ser. No. 09/766,474, filed Jan. 19, 2001, now U.S. Pat. No. 6,985,671 the entirety of which is incorporated herein by reference.

BACKGROUND OF THE INVENTION

1. Field of the Invention

The present invention relates to a data recording and reproducing apparatus for superimposing character data or the like on a material sent out from, for example, an AV server system, and a data recording and reproducing apparatus for managing the present recording and reproducing apparatus and files concerning resources such as devices connected to the present recording and reproducing apparatus.

2. Description of the Prior Art

With the advance of multi-channel data provision due to the spread of the CATV (cable television), demands for simultaneously recording and reproducing a plurality of video and/or audio data (hereafter referred to as AV data) by using a single recording and reproducing apparatus and for reproducing data while recording data unlike conventional VTRs (video tape recorders) are growing intense in recent years. And in order to satisfy the demands, an apparatus called video server (or also called AV (Audio and Video) server) which records and reproduces AV data by using a random accessible recording medium such as a hard disk is spreading.

In general, each of AV servers in broadcast stations must have a large capacity because the needed data transfer rate is high and data of a long time must be recorded because of demands on the picture quality and sound quality. Therefore, there have been made an attempt to increase the data transfer rate and the capacity by using a plurality of hard disks hereafter referred to as HDs) capable of storing AV data and conducting parallel processing, and an attempt to secure the reliability even if any HD device should fail, by recording parity data.

Even in the case where demanded numbers of channels are different according to the contents of programs provided by broadcasting stations and broadcast forms, material data including a plurality of AV data are recorded distributively, a large number of channels are sent out simultaneously, and the same material data are reproduced in a multichannel form with staggered reproduction times. By doing so, systems such as VOD (video on demand) and NVOD (near video on demand) are constructed. Thus, a multi-channel AV server capable of coping with a wide variety of use forms can be implemented.

In the HD apparatus used in such an AV server, there is used an RAID (Redundant Arrays of Inexpensive Disks) technique advocated in Patterson, "A case for Redundant Arrays of Inexpensive Disks (RAID)", ACM SIGMOND Conference, Chicago, Ill, Jun. 1-3, 1988. In the RAID technique, a plurality of hard disk drives (hereafter referred to "HDD") each formed of a plurality of HDs are arranged.

In the aforementioned paper, RAIDs are classified into five categories, RAID-1 to RAID-5. RAID-1 is a scheme in which the same content is written in two HDDs. RAID-3 is a scheme in which input data is divided into fixed lengths and recorded on a plurality of HDDs, and parity data which is exclusive OR of mutually associated data blocks of each HDD is generated and written into another HDD. RAID-5 is a scheme in which the unit (block) of data division is made larger and one divisional data is recorded in one HDD as a data block, and in addition a result (parity data) obtained by deriving an exclusive OR of mutually associated data blocks of each HDD is recorded in other HDDs and the parity block is distributed among other blocks.

As for other RAIDS, see the aforementioned paper.

If any HD fails and the HD is replaced by a new HD in an HD apparatus (hereafter simply referred to as "RAID") using this RAID technique, it is possible to restore data on the failed HD by using data and parity data reproduced from HDs, recording the restored data in the new HD, and thereby rebuild or reconstruct the data on the failed HD.

For conducting simultaneous recording and reproducing of a plurality of AV data, it is necessary to conduct AV data inputting and outputting simultaneously in a plurality of channels. In the AV server, therefore, there are provided a plurality of input/output ports which operate independently of each other, and one input port and one output port inputs and outputs data corresponding to one channel.

If input/output ports conduct transfer of AV data with the RAID completely at the same time, then those AV data flow simultaneously on a bus connecting input/output ports to RAIDs in the AV server, and it becomes impossible to process the AV data. Therefore, time slots (=time intervals) for which use of the bus is permitted are assigned to input/output ports in order, and each input/output port conducts transfer of AV data with an RAID via the bus in only the assigned time slot. Strictly speaking, therefore, a plurality of AV data are not recorded and reproduced simultaneously. When viewed in the context of a time span longer than a time slot, however, it can be said that the simultaneous recording and reproducing of a plurality of AV data are accomplished.

In an AV server system formed in a broadcasting station by using such an AV server as the nucleus, in general, files describing types and parameters of individual resources hardware resources such as HDDs and input/output ports and software resources) of the AV server are managed in the form of a database.

As for advantages of sending out of a material by using this AV server in a broadcasting station, there can be mentioned an advantage that sending of a recorded material can be started quickly because reproducing can be made while conducting reproducing, and an advantage that the order of sending of recorded materials can be altered arbitrarily because random access is possible.

By the way, when sending out a material in a broadcasting station, it is widely conducted to superimpose character data or the like on the material. For example, in a music program, character data representing a title of a musical composition and/or an artist name are superimposed on a video image of the artist.

Conventionally, for conducting such superimposition in a broadcasting station, at an editing stage before starting the send-out, a superimposed material is produced by combining the character data or the like with the material and the superimposed material is recorded.

However, with such a conventional superimposing method, the number of man-hours is large. Accordingly, the cost and labor are substantially increased.

In such a conventional superimposing method, however, the number of man-hours is large and consequently it takes a long time until it becomes possible to send the superimposed material. If the conventional superimposing method is adopted when sending out a material by using the AV server, therefore, then the advantage of the AV server that sending of the recorded material can be started quickly cannot be made the most of.

Furthermore, when the order of sending out materials is altered in the middle of superimposing according to a specified order of sending out materials, it is difficult to cope with this flexibly in the conventional superimposing method. If the conventional superimposing method is adopted when sending out materials by utilizing the AV server, then the advantage of the AV server that the order of sending out recorded materials can be altered arbitrarily cannot be made the most of.

Furthermore, the above described conventional AV server system in the broadcasting station has the following disadvantages.

(a) There are a large number of resources in the AV server. (For example, there are approximately 300 resources in a certain AV server.) Therefore, it is difficult to grasp the entire structure of the AV server from the files describing the types and parameters of a large number of resources. Also in the case where a fault occurs in any resource, it is difficult to determine from these files which position the resource assumes in the entire AV server. Therefore, it takes a long time to grasp the fault and cope with the fault.

(b) Operation for rebuilding differs according to whether the type of the RAID is SCSI or SBX. At the time of rebuilding, it is necessary to determine which type of RAIDs the AV server of the AV server system has and then conduct operation corresponding to the type. In addition, operation for the SCSI type is writing a sequence for each system by using an application tool (such as LightChk. exe), and its operation is troublesome. On the other hand, as for operation for an RAID of the SBX type, a personnel of maintenance service interrupts the system running and conducts the operation by using a dedicated tool, and the operation cannot be conducted during the system running. A user (i.e., a user of the AV server system in a broadcasting station) cannot conduct the operation.

SUMMARY OF THE INVENTION

In view of the above described points, an object of the present invention is to facilitate in an AV server system grasping the entire structure of an AV server and determining which position a failed resource assumes in the entire AV server, and allow a user to conduct easily operation for rebuilding during system running.

Another object of the present invention is to reduce the cost and labor for superimposition when sending out a material by utilizing the AV server, and conduct the superimposition while making the most of the advantages of the AV server.

The above described objects are achieved by the following aspects of the present invention.

In accordance with a first aspect of the present invention, a material recording and sending system includes: material recording and reproducing means comprising recording and reproducing means for recording and reproducing a material containing video and/or sound data into and from a nonlinear accessible recording medium, and a plurality of input/output processing means for processing the material inputted from the outside and outputting the material to the recording and reproducing means in an assigned time slot interval, and receiving the material reproduced by the recording and reproducing means in an assigned time slot interval and outputting the material to outside; selection means comprising a plurality of input channels and a plurality of output channels, the selection means conducting input channel and output channel selection so as to output the material inputted to at least one of the plurality of input channels, from at least one of the plurality of output channels and input the material to input/output processing means of the material recording and reproducing means, the selection means conducting input channel and output channel selection so as to input the material outputted from input/output processing means of the material recording and reproducing means, to at least one of the plurality of input channels and output the material from at least one of the plurality of output channels; and operation means for ordering operation of recording the material inputted via the selection means, into the material recording and reproducing means and/or operation of reproducing the material to be outputted via the selection means, from the material recording and reproducing means. The operation means includes display means for hierarchically displaying resources including the recording medium, the recording and reproducing means and the input/output processing means of the material recording and reproducing means, and input channels and output channels of the selection means, according to connection situations.

In accordance with a second aspect of the present invention, a material recording and sending system includes: material recording and reproducing means including recording and reproducing means for recording and reproducing a material containing video and/or sound data into and from a nonlinear accessible recording medium, and a plurality of input/output processing means for accessing the recording and reproducing means in an assigned time slot and outputting the material inputted from outside, to the recording and reproducing means, and receiving the material reproduced by the recording; selection means having a plurality of input channels and a plurality of output channels, the selection means conducting output selection so as to output the material inputted from an input channel, from at least one of the plurality of output channels and input the material to input/output processing means, the selection means conducting output selection so as to input the material outputted from input/output processing means, to an input channels and output the material from at least one of the plurality of output channels; and operation means for ordering operation of recording the material into the material recording and reproducing means and/or operation of sending the material from the material recording and reproducing means. A resource display method in the material recording and sending system includes: first step of hierarchically displaying resources including the recording medium, the recording and reproducing means, the input/output processing means, the input channels, and the output channels, according to connection situations of the resources; and second step of causing the display means to display detailed information of a resource selected from among resources displayed on the display means.

In accordance with a third aspect of the present invention, a material recording and sending system includes: material recording and reproducing means including recording and reproducing means for recording and reproducing a material containing video and/or sound data into and from a nonlinear accessible recording medium, and a plurality of input/output processing means for processing the material inputted from outside and outputting the material to the recording and reproducing means in an assigned time slot interval, and receiving the material reproduced by the recording and reproducing means in an assigned time slot interval and outputting the material to outside; and operation means for ordering operation of recording the material into the material recording and reproducing means and/or operation of reproducing the material from the material recording and reproducing means. The operation means includes display means for hierarchically displaying resources including the recording medium, the recording and reproducing means and the input/output processing means of the material recording and reproducing means, according to connection situations, and responding to fault occurrence in the recording and reproducing means, to conduct operation display in order to make it possible to select a resource indicating the recording medium and rebuild the material which cannot be recorded or reproduced due to the fault. When rebuilding is ordered on the display means, the material recording and reproducing means rebuilds the material and records the rebuilt material in the recording medium.

In accordance with a fourth aspect of the present invention, a material recording and sending system includes: material recording and reproducing means including recording and reproducing means for recording and reproducing a material containing video and/or sound data into and from a nonlinear accessible recording medium, and a plurality of input/output processing means for processing the material inputted from outside and outputting the material to the recording and reproducing means in an assigned time slot interval, and receiving the material reproduced by the recording and reproducing means in an assigned time slot interval and outputting the material to outside; and operation means for ordering operation of recording the material into the material recording and reproducing means and/or operation of reproducing the material from the material recording and reproducing means. A resource display method in the material recording and sending system includes: first step of hierarchically displaying resources including the recording medium, the recording and reproducing means, and the input/output processing means, according to connection situations of the resources; and second step of causing the display means to display detailed information of a resource selected from among resources displayed on the display means.

In accordance with a fifth aspect of the present invention, a superimposing apparatus includes: material reproducing means including reproducing means for reproducing a material containing video and/or sound data from a nonlinear accessible recording medium, and a plurality of output processing means for receiving the material reproduced by the reproducing means in an assigned time slot interval and outputting the material to the outside; superimposition information generating means for generating superimposition information including letter data or character data to be inserted in an image of the material; control means for controlling reproducing operation of the material in the material reproducing means; timing pulse generating means for generating a timing pulse to be used to insert the superimposition information in the material, the timing pulse generated from the timing pulse generating means being supplied to the control means and the superimposition information generating means; and combining means for receiving the material reproduced and outputted from the material reproducing means controlled by the control means according to the timing pulse, and the superimposing information outputted from the superimposition information generating means according to the timing pulse, combining an image of the material with the superimposing information, and outputting a resultant image.

In accordance with a sixth aspect of the present invention, there is provided a superimposing method for combining superimposition information including letter data or character data with a video material, a material including video data recorded in a nonlinear accessible recording medium being reproduced by reproducing means and being inputted in an assigned time slot interval to material reproducing means formed of a plurality of output means for outputting the material to the outside, and the video material being outputted from the material reproducing means. The superimposing method includes: first step of generating the superimposition information; second step of outputting the generated superimposition information and generating a timing pulse for outputting the material from the reproducing means; third step of responding to input of the timing pulse, to cause the reproducing means to reproduce the material from the recording medium and output the material to the outside, and in addition, output the superimposition information generated at the first step; and fourth step of combining the superimposition information outputted at the third step with the video material included in the material outputted at the third step.

BRIEF DESCRIPTION OF THE DRAWING

FIG. 2 is a diagram showing a configuration of an AV server section;

FIG. 3 is a diagram showing a picture displayed on an operation terminal to specify a material to be recorded and its recording timing;

FIG. 4 is a diagram showing a picture displayed on an operation terminal to specify a material to be sent out and its sending timing;

FIG. 8A is a diagram showing contents of RESOURCE SMS included in a SMS Config file;

FIG. 8B is a diagram showing contents of a SMS file included in a SMS Config file;

FIG. 9 is a diagram showing an example of description of an IDC CFS file;

DETAILED DESCRIPTION OF THE PREFERRED EMBODIMENTS

Hereafter, an example of application of the present invention to an AV (Audio and Video), system will be described.

Figure 1:
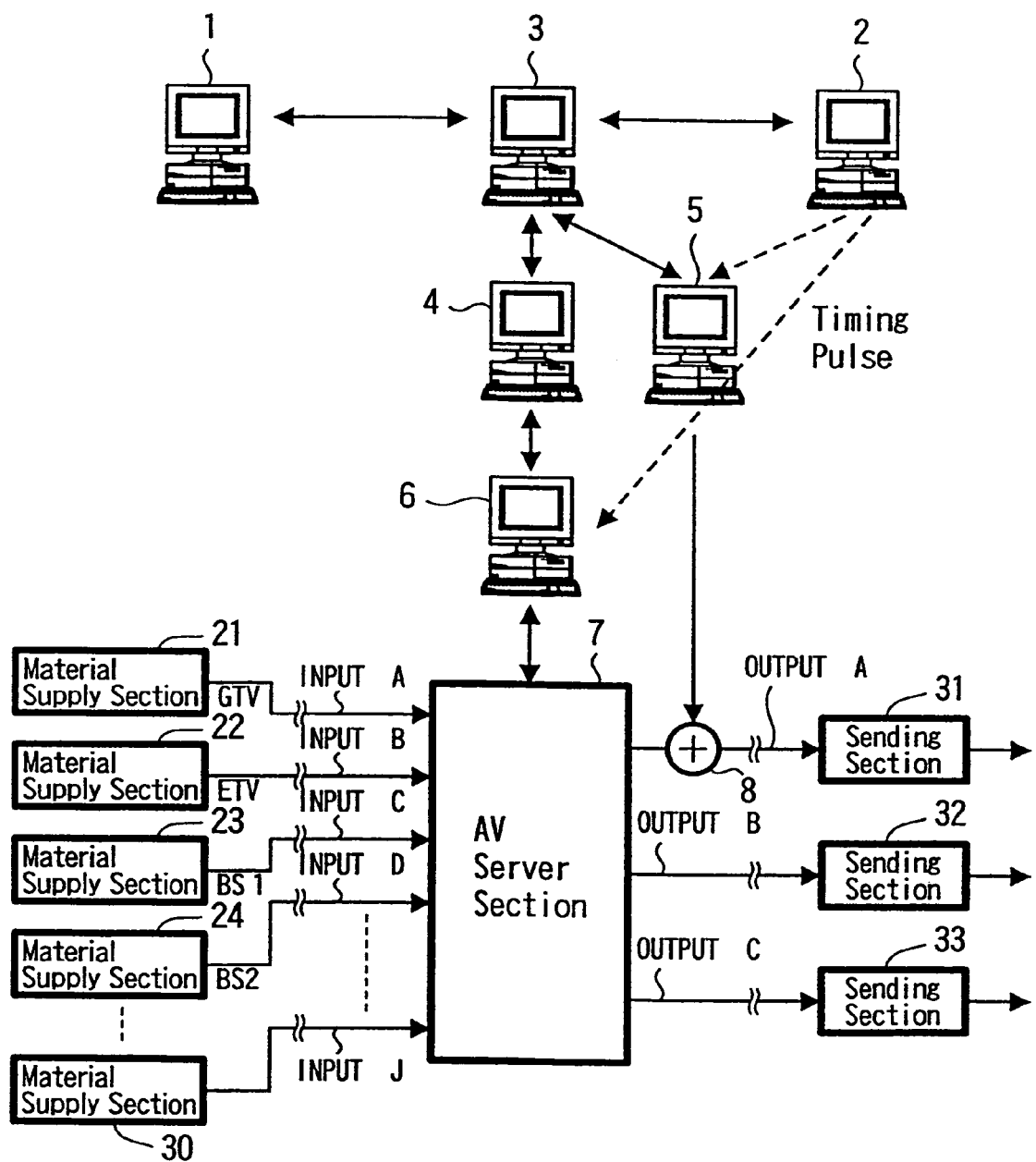
FIG. 1 is a diagram showing an entire configuration of an AV server system according to the present invention.

FIG. 1 shows an entire configuration of an AV server system according to the present invention. This system includes an operation terminal 1, an upper terminal 2, a DB (data base) terminal 3, a SVM (server manager) terminal 4, a superimposition generating terminal 5, and an SMSGW (server management system gateway) terminal 6. These terminals are coupled by a network such as Ethernet. In addition, an AV server section 7 is connected to this network via the SMSGW terminal 6.

From a plurality of material supply sections 21 to 30 located outside the AV server system, AV data (Audio and/or Video data which are materials to be recorded) are supplied simultaneously to the AV server section 7 via input lines. INPUT_A TO INPUT_J, respectively. Program materials to be broadcasted in ground wave broadcast and satellite broadcast (such as GTV, ETV, BS1 and BS2) are also included in the AV data.

AV data outputted from the AV server section 7 is supplied to at least one of a plurality of sending sections 31 to 33 located outside the AV server system via output lines OUTPUT_A to OUTPUT_C, respectively, and sent out from the pertinent sending section.

Each of the terminals 1 to 6 includes a personal computer or a work station for executing an application corresponding to each function.

The operation terminal 1 is a terminal for determining a material recorded in the AV server section 7 in a GUI (Graphical User Interface) base or to be sent out, specify recording time of the recorded material and sending time of the material to be sent out, and determining the current state of the AV server itself. The information indicating the current state is information indicating an application to be executed in the present system, a material currently recorded or being sent, and states (whether devices are usable and communication with an SMS 6 is possible) of devices (such as individual HDDs and input/output ports). Furthermore, such specification of time and a material is conducted by inputting information into a GUI-displayed configuration table concerning a program configuration called play list of sent programs. This play list is formed so that for example, a title of a musical composition, an artist name, a record company, a sending time, and a name of a file storing a material to be sent may be inputted.

The upper terminal 2 is a terminal for managing the above described play list. Specifically, the upper terminal 2 manages information concerning the running of the broadcasting station by extracting recorded material information and sent material information on the basis of the play list, providing the information to the AV server section 7, and recording and managing the execution situation in the AV server section 7. When time specified in the play list is reached, a timing pulse indicating output timing of data is supplied to the SMS/GW terminal 6 and the superimposition generating terminal 5.

The DB (data base) terminal 3 has a series of information registered as a data base, such as information displayed in the play list on the operation terminal 1 and information indicating the current state of the AV server section 7.

The SVM terminal 4 generates a command for ordering material recording or sending and sends it to the SMSGW terminal 6, on the basis of information on recording time and sending time of recording materials and materials to be sent, registered in the DB terminal 3. As a result, recording or sending of a material inputted in the above described play list is executed.

The SMSGW terminal 6 is supplied with a sending and recording command from the SVM terminal. On the basis of the command, the SMSGW terminal 6 arbitrates as to which resource the command should be issued to. The AV server has a plurality of resources as described above. In the case where there are a plurality of upper operation terminals 1, a plurality of upper operation terminals might conduct recording and sending of the same resource simultaneously. In order to arbitrate this, the SMSGW terminal conducts resource management.

Details of the terminals 1 to 6 will be described later.

FIG. 2 shows a configuration of the AV server section 7. The AV server section 7 includes an IDC (intelligent device controller) 11, SubIDCs (subintelligent device controllers) 12 to 14, AV servers 15 and 16, and a router 17. A command is sent from the SMSGW terminal 6 to the AV server 15 via the IDC 11 and the SubIDC 12. A status is sent from the AV server 15 to the SMSGW terminal 6 via the SubIDC 12 and the IDC 11. In the same way, transmission of a command and a status is conducted between the AV server 16 and the SMSGW terminal 6 via the IDC 11 and the SubIDC 13, and between the router 17 and the SMSGW terminal 6 via the IDC 11 and the SubIDC 14.

The AV server 15 includes three input/output ports 15_a_ to 15_c_, a recording/reproducing controller 15_d_ for controlling these input/output ports, and a recording and reproducing section 15_e_. Each of input/output ports 15_a_ to 15_c_ can conduct inputting AV data corresponding to one channel and outputting AV data corresponding to one channel. The recording and reproducing section 15_e_ includes a RAID including a plurality of hard disk drives (HDDs). Here, the recording and reproducing section 15_e_ includes the RAID 3. The AV server 16 also has the same configuration as that of the AV server 15.

A plurality of AV data (materials to be recorded) supplied to the AV server section 7 via the input lines INPUT_A to INPUT_J are inputted to some of a total of six input/output ports, i.e., the input/output ports 15_a_ to 15_c_ and 16_a_ to 16_c_ respectively of the AV servers 15 and 16 by switching in the router 17. The AV data inputted to the input/output ports 15_a_ to 15_c_ and 16_a_ to 16_c_ are subject to compression processing and so on, and transferred to the recording and reproducing sections 15_e_ and 16_e_, respectively.

Here, data inputted to/outputted from the router 17 are transferred in a data format of SDI (Serial Digital Interface, standardized as SMPTE-259M) and SDTI (Serial Digital Transfer Interface, standardized as SMPTE-305M). As a matter of course, in the present embodiment, not only the data format of such a synchronizing system, but also a fiber channel or Ethernet of the TCP/IP protocol may be used. Therefore, input/output ports 15_a_ to 15_c_ and 16_a_ to 16_c_ conduct processing of taking out AV data from data transmitted in the above described transfer format and compression processing as occasion demands.

In each of the recording and reproducing sections 15_e_ and 16_e_, the transferred AV data is divided into fixed length blocks and recorded in a plurality of HDDS, and parity data which is exclusive OR of mutually associated data blocks of those HDDs is generated and written into another HDD.

In the input/output ports 15_a_ to 15_c_ and 16_a_ to 16_c_, AV data reproduced in the recording and reproducing sections 15_e_ and 16_e_ and transferred from the recording and reproducing sections 15_e_ and 16_e_ are subject to expansion processing and so on as occasion demands, and converted to the above described transfer format to be outputted from the input/output ports 15_a_ to 15_c_ and 16_a_ to 16_c_. The AV data outputted from the input/output ports 15_a_ to 15_c_ and 16_a_ to 16_c_ are supplied to some of the sending sections 31 to 33 via the output lines OUTPUT_A to OUTPUT_C as shown in FIG. 1 by switching in the router 17. Here, as shown in FIG. 1, the AV data to be supplied to the sending section 31 is combined in a combining circuit 8 with character data outputted from the superimposition generation terminal 5.

The IDC (Intelligent Device Controller) 11 is a controller for causing a command transferred from the SMSGW terminal 6 to be executed in real time. Specifically, in the case where a command ordering recording start or sending start transferred from the SMSGW terminal 6 is inputted, the IDC 11 controls the AV servers 15 and 16 so as to record a material in the AV server 15 and 16 or send out the material therefrom. The IDC 11 temporarily is so formed as to store the command for ordering recording and sending transferred from the SMSGW terminal 6 and receive a GPI signal for firing the command although not illustrated. Simultaneously with input of the GPI signal, the ordering command is fired and the command is outputted to the AV servers 15 and 16 via the SubIDCs 12, 13 and 14. As a result, contents of the command are executed, and recording or sending of a material is conducted in sync with time. Or a timer is provided within the IDC 11, and when specified time is reached, the temporarily stored command is fired and recording or sending of the material is conducted in sync with time. As a matter of course, an order is included in the command by the operation terminal 1 so as to select either manual firing using the GPI signal or automatic firing using the timer. By the way, a command indicating the switching time of the router 17 is also outputted from the operation terminal 1. Therefore, the pertinent command is also inputted to the IDC 11, and the router is switched according to the sending time by using the above described method.

The SubIDCs 12, 13 and 14 transfer the commands from the IDC 11 to required devices such as the connected router 17 and ports. The reason why there are a plurality of IDCs 12, 13 and 14 is that command contents supplied from the upper terminal nearly coincide for each of connected devices and command firing according to the above described time is conducted by dispersing the function of the IDC. In the present embodiment, the SubIDCs 12 and 13 are connected to the AV servers 15 and 16, respectively, and the SubIDC 14 is connected to the router 17.

FIG. 3 is a diagram showing a picture displayed on the operation terminal 1 to specify a recording material and its recording timing.

A GUI for setting details of a recording material is shown in FIG. 3.

The picture of FIG. 3 includes a display column concerning a program such as a program code 510 and a program name 513, and a display column 515 concerning details of a material to be recorded.

In the program code 510, information indicating a program ID is displayed. An identification code predetermined for each program is displayed.

An input line selection button 511 allows selection from input lines INPUT A to INPUT J for each sound channel and the selected input line is displayed in an input line display column 512.

In the program name display column 513, a broadcast program name is inputted and displayed.

In a subtitle column 514, a subtitle of the program name is inputted and displayed.

In a recording date column 515, the date set for recording is inputted and displayed. After recording, the date on which recording was actually conducted is inputted and displayed in the recording date column 515.

Before material recording (before recording in the AV servers 15 and 16), time set for recording start and time set for recording end are inputted and displayed in a start time column 516 and an end time column 517, respectively. After material recording (after recording in the AV servers 15 and 16), start time and end time of actually conducted recording are inputted and displayed in the start time column 516 and the end time column 517, respectively.

In a recording material length column 518, a material length of each recording material is displayed in a time form.

In an STC (start of Time Code) column, either a time code display obtained by referring to an input material or a time code display obtained by setting the head of the recording material to "0" is selected as a time code of the recording material. The case where an input material is referred to is the case where a synchronizing signal can be inserted in the above described SDI and SDTI and the time code of the material is displayed on the basis thereof. This case is selected by using a selection button 519. The case where the time code display obtained by setting the head of the recording material to "0" is selected by using a selection button 520.

In an SOM (Start Of Material) display column 521, a time code of the head of the material is displayed on the basis of the time code display selected in the STC column. In an EOM (End Of Material) display column 522, a time code of the end of the material is displayed on the basis of the time code display selected in the STC column. In either case, a time code is displayed not only in hour, minute and second but also in frame.

In a recording resource display column 523, there is inputted and displayed a resource in which the recording material should be recorded. If the right side of the recording resource display column 523 is selected with a mouse or the like, then a list of resources is displayed, a desired resource can be selected, and the selected resource is displayed.

Sound mode columns 524 and 525 are columns for selecting and displaying whether each channel carries stereophonic sound or monaural sound. Various sound modes can be selected and inputted.

A recording method column 526 is a column for selecting and displaying either automatic recording or manual recording. Automatic recording refers to the case where the recording material is automatically recorded from the beginning. Manual recording refers to the case where, for example, tape cassettes having materials stored therein are inserted into the material supply sections 21 to 30 and the materials are recorded by manual operation.

In a time differential flag setting column 527, either sending a recording material without a time differential or sending it with a time differential can be set.

An editing column 528 is a display column for indicating whether editing of the recording material is necessary, unnecessary, or already conducted. By operating a desired button on the GUI, selection and display are conducted.

A sending information column 529 includes a date column for indicating the sending date, a start time column for indicating sending start time, an end time column for indicating sending end time, and a broadcast material length column for indicating the length of the sending material. The information concerning the sending is specified by a sending material detail picture shown in FIG. 4. If the material was already sent, the date of actual sending and so on are displayed. If the sending schedule was determined and already inputted by using the sending material detail picture shown in FIG. 4, the necessary time is displayed in each item.

In a remarks column 530, the operator can input and display necessary information when desiring to leave it as a note.

In a deletion schedule date column 531, a schedule date can be inputted in the case where a recorded material is to be deleted from the AV server section 7.

In a material file name column 532, status information of the recording material is displayed.

In an error detail content column 533, detail contents of an error are displayed, in the case where the error is displayed in the status of the material file name column 532.

An update button 534 is a button required when updating each information inputted by using this recording material detail picture. All of the information inputted by operation on the picture is updated.

A close button 535 is a button required when closing the recording material detail picture. The button is activated by operation on the picture.

FIG. 4 shows a sending material sending picture displayed on the operation terminal 1 to specify a material to be sent out and its sending timing. The program name and subtitle inputted on the recording material detail picture at the time of AV data recording are pasted up on the picture by using mouse operation such as "copy and paste" or "drag and drop." By doing so, the program name and the subtitle are inputted to a column 61.

In a sending date column 62, a date on which the sending material is to be sent (broadcasted) is inputted. In a start time column 63 and an end time column 64, sending start time and sending end time of the sending material are inputted, respectively.

In a sending length column 65, a value indicating the length of the sending material by using the time code is inputted.

In an SOM point column 66 and an EOM point column 67, a start time code and an end time code of the sending material are inputted, respectively.

In an error detail content column 68, information concerning an error of each material required at the time of sending is inputted and displayed.

In the case where it is desired to insert different data into data of each column already inputted, an insertion button 69 is activated by operation on the picture and mouse click. In the case where it is desired to close the sending material sending picture, a "close" button is activated by operation on the picture in the same way.

With respect to a material (such as a material of a special newscast) for which recording, sending, and timing of recording and sending are not determined by a play list (such as a program configuration table) in the broadcasting station, the user can call the picture of FIG. 3 or 4, specify the material as the subject of recording and sending, or specify the timing of recording and sending.

As described above, in the DB terminal 3, information displayed in the play list on the operation terminal 1 and information indicating the states of devices are registered as a data base beforehand.

Information indicating the current state of the AV server system includes information concerning the already recorded material, application executed in the AV server system, a material currently being recorded and sent, and states of individual resources of the AV server section 7 (information as to whether an individual resource is usable or whether an individual resource is communicating with the SMSGW terminal 6).

Figure 5:
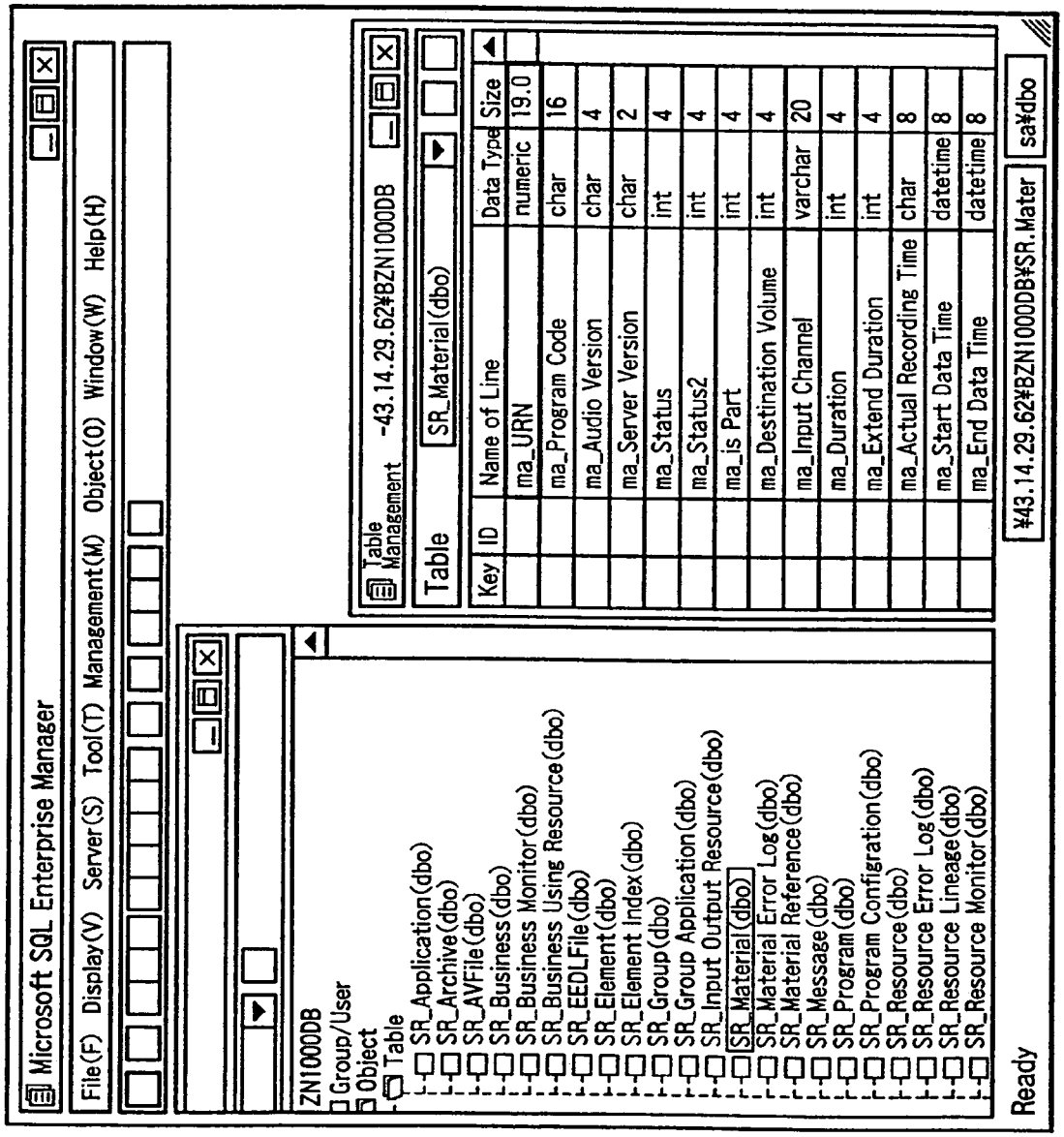
FIG. 5 is a diagram showing an example of a picture of a data base displayed on a screen.

FIG. 5 shows an example of a picture of the data base displayed on a screen. On the left half of the picture, a list including file names of already recorded materials, file names in an application executed in the AV server system, materials which are currently being recorded and sent, and states of individual resources of the AV server section 7 is displayed as a table.

Furthermore, various parameters concerning a file "SR_Material (dbo)" (a file reverse-displayed in FIG. 5) in an application selected from the table by mouse operation are displayed on the right half of the picture. A code name following "ma" in "column name" of the picture is peculiar to the column name. If any column name is selected by mouse operation, information such as audio setting, material editing generation, and status is displayed on the picture by using the code name as a key.

In the SVM terminal 4 of FIG. 1, a command for ordering material recording and sending is generated on the basis of information of the material of the recording and sending subject and the timing of recording and sending registered in the DB terminal 3 as described above, and the command is sent to the SMSGW terminal 6.

To be more concrete, the SVM terminal 4 includes a recording manager and a sending manager for issuing a macro instruction of recording and sending and its parameter on the basis of information on the material of the recording subject, sending subject, recording timing, and sending timing registered in the DB terminal 3, and an EZMAX for taking over this macro instruction and parameters from the recording manager and the sending manager and conducting device control communication between it and the SMSGW terminal 6.

In the SVM terminal 4, fault processing (alarm information generation and assignment of processing executed by a failed device to another device) is conducted when a fault has occurred in any device of the AV server section 7.

In the superimposition generation terminal 5, character data for superimposition is generated on the basis of information of a material of sending subject and its sending timing registered in the DB terminal 3. The character data is outputted from the superimposition generation terminal 5 on the basis of a timing pulse supplied from the upper terminal 2.

As described earlier, the SMS/GW terminal 6 is a terminal for arbitrating use of a plurality of lower devices when there are a plurality of upper operation terminals.

Figure 6:
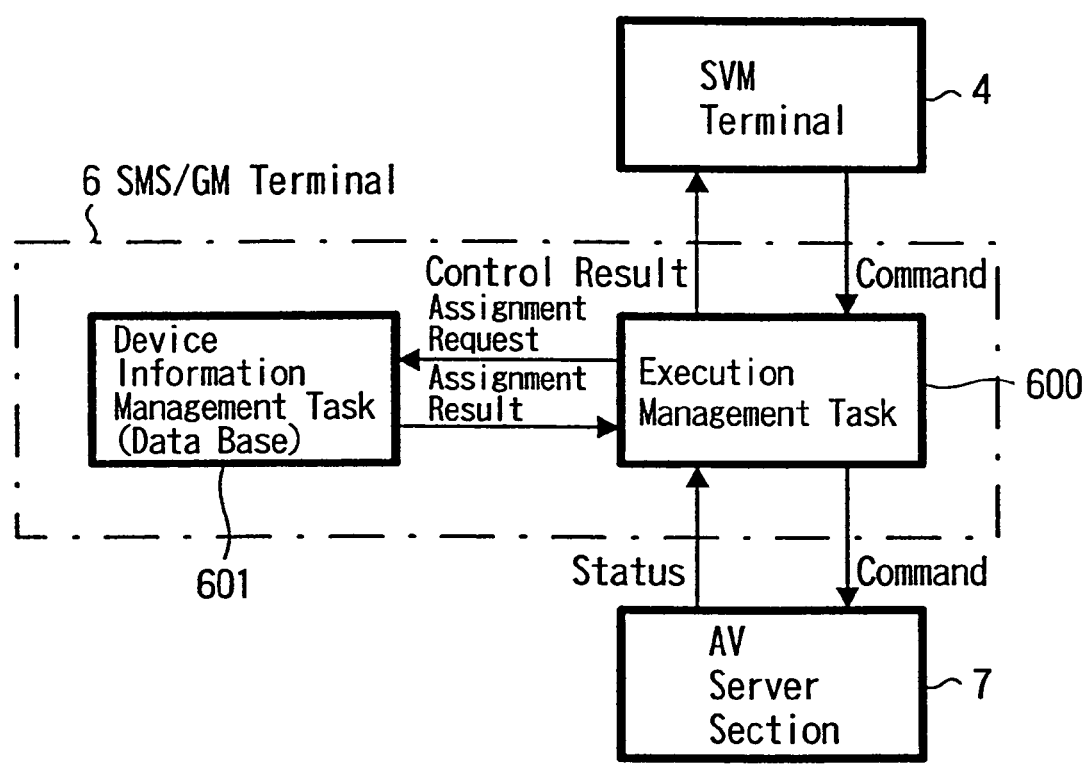
FIG. 6 is a diagram showing a configuration of an SMSGW terminal.

FIG. 6 shows the configuration of the SMS/GW terminal 6.

The SMS/GW terminal 6 includes two tasks: an execution management task 600 and a device information management task 601.

The execution management task 600 is supplied with various commands from the operation terminal 1 via the SVM terminal 4.

Commands to be inputted are commands for selecting devices desired to be used from the operation terminal 1, such as input channels INPUT_A to INPUT_J for materials inputted to the router 17, output channels of the router 17 to the AV server 7, input ports 15*a* to 15*c* and 16*a* to 16*c* for material recording, an HDD desired to record, output 15*a* to 15*c* and 16*a* to 16*c* for material outputting, input channels of the router 17 to be inputted to the router 17, and output channels OUTPUT_A to C. Those commands are called Open commands. The Open command has the following form.

Open RSC=(RSC name) PR=(priority)

The RSC name refers to the above described device. The priority refers to priority in the case where the upper operation terminal 1 wants to occupy and use a device. The priority is determined according to the importance of operation.

If the Open command is inputted to the execution management task 600, then the content of the command, here Open, is analyzed, and information concerning the resource name and the priority is inputted to the device information management task 610 as an assignment request.

The device information management task 601 has a data base formed of information as to which operation terminal 1 is using each resource with which priority. It is determined from an assignment request inputted from the execution management task 600 whether a desired resource is being used. If it is determined on the basis of the data base that the desired resource is not being used, then the desired resource is added to the data base, and an assignment permission notice is returned to the execution management task 600. Furthermore, even if the desired resource has already been added to the data base, in the case of high priority, information is rewritten so as to be replaced by the information of the operation terminal 1 in order to alter the resource use permission and a permission notice is returned to the execution management task 600. In the case of low priority, a refusal notice which does not permit the use is returned to the execution management task 600. For an assignment request from the execution management task 600, therefore, a notice of an assignment result is given. To this information indicating the use permission, an identification code (referred to as stream ID) is added.

Information indicating the use permission in response to the open command is outputted from the execution management task 600 to the operation terminal 6 which has issued the Open command via the SVM terminal 4.

Thereafter, the operation terminal which has received the use permission of the desired resource (device) can occupy and use the resource exclusively as against other operation terminals 1. When using the desired resource, the operation terminal issues commands of recording and sending by using the above described stream ID.

For example, a command for ordering recording of the resource permitted to use has the following form:

RECORD SID=(stream ID) (material name)

By using only ID, there is obtained a merit that up to the stream need not be specified concretely.

As for the reproduction as well, the recording material can be sent out in the following form:

PLAY SID=(stream ID) (material name)

Figure 7:
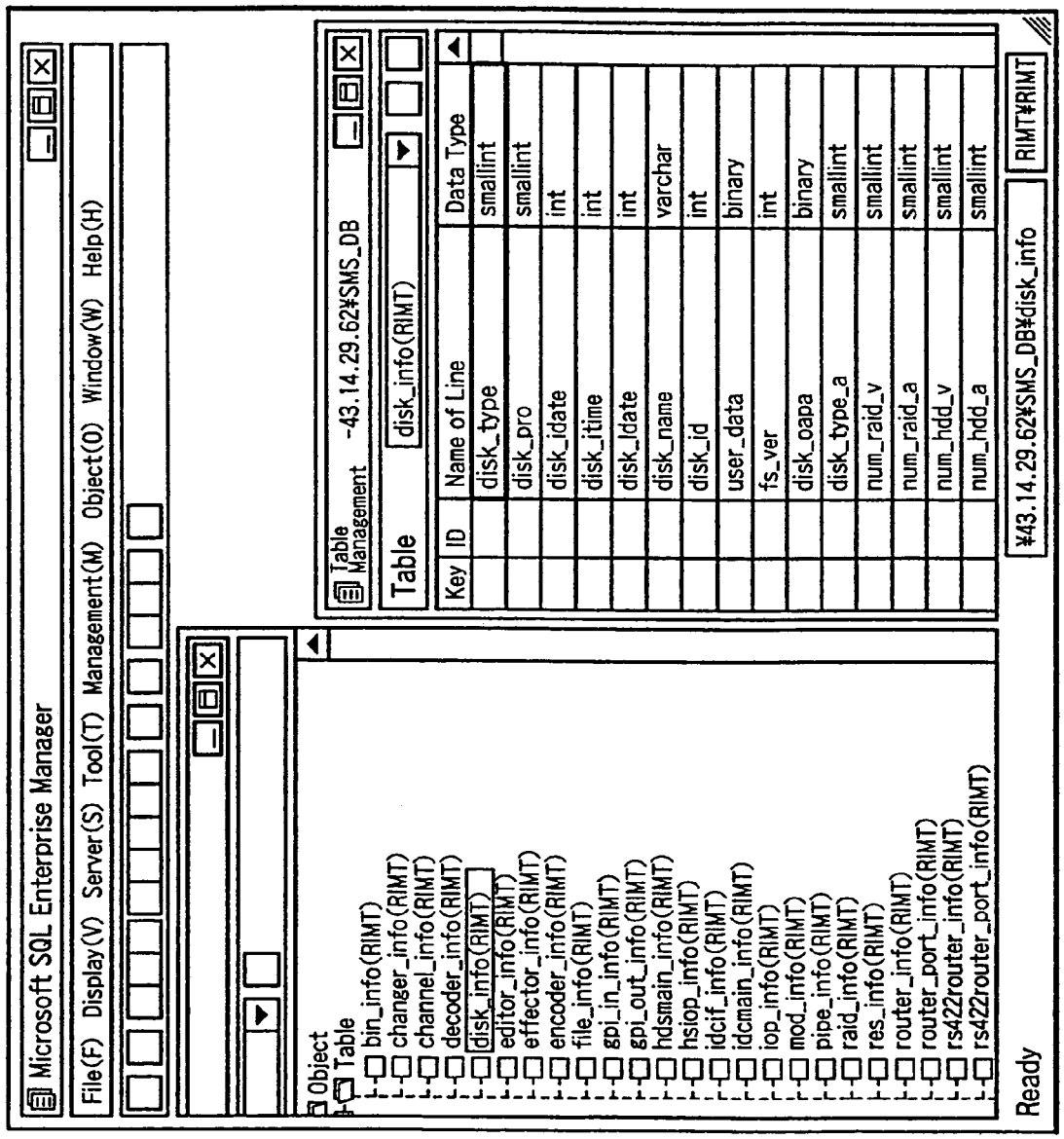
FIG. 7 is a diagram showing an example of a picture of a data base for resource information management task displayed on a screen.

FIG. 7 shows an example of a screen display of a data base for resource information management task. On the left half of the picture, a list of resources of the AV server section 7 is displayed as a table. Furthermore, various parameters concerning a resource "disk_info (RIMT)" (a resource reverse-displayed in FIG. 7) selected from the table by mouse operation are displayed on the right half of the picture.

Data base forming processing in the resource information management task 601 is conducted on the basis of describing the type and parameters of a resource in an SMS_Config file (extension SMS) and an IDC_CFS file (extension CFS) and registering these files in the SMSGW terminal 6 at the time of introduction of the AV server system.

The SMS_Config file includes RESOURCE SMS and SMS files. The RESOURCE SMS file is a file for comprehensively describing the whole resource. In the RESOURCE SMS file, the resource type, resource ID, resource group name, and status in the initial state are described. In the SMS file, resource parameters are described for each of individual resources described in the RESOURCE SMS file.

The device information management task 601 has been described by referring to an example in which the device information management task 601 is a data base mainly formed of resource names and priorities. As a matter of fact, the device information management task 601 includes resource names, resource IDs, resource types, resource group names, resource states, resource initial states, resource communication states, reservation user names, and reservation priorities.

As described above, the resource name is a device name.

The resource ID is a code for identifying a resource.

The resource type is classified by the kind of device such as an input/output port, RAID, or router. For example, a resource name "SMS_1" refers to the SMS/GW terminal 6, and consequently its resource type is "SMS". A resource name "IDC_1" refers to the IDC 11, and consequently its resource type is "IDCMAIN".

The resource group name indicates each resource type by a predetermined group name. For the resource name "SMS_1", a resource group name "GP_SMS" is used. For the resource name "IDC_1", a resource group name "GP_IDC" is used.

The resource state indicates the current usage state of each resource.

The resource initial state indicates whether each resource can be used at an initial stage.

The resource communication state indicates whether each resource is connected to the SMS/GW terminal 6.

The reservation user name indicates a name or ID of an operation terminal 1 permitted to use.

The reservation priority indicates the value of priority with which the operation terminal 1 has been permitted to use.

FIG. 8A shows contents of RESOURCE SMS included in the SMS_Config file including the resource names, resource types, resource IDs, resource group names, and resource initial state.

For the resource name "SMS_1", a resource type of "SMS", a resource ID of "1", a resource group name of "GP_MTPSER", and an initial state of "ENABLE" representing a usable state are indicated.

FIG. 8B shows contents of the SMS file included in the SMS_Config file. For a resource ID, resource parameters include a device ID, IDC type, distance, resource name, interface ID, and interface type.

The device ID is a code for identifying a device. Each resource is provided with a device ID. The device ID is indicated by an IP address. The IDC type indicates the IDC 11, the SubIDC 12, SubIDC 13, or SubIDC 14. As for the distance, only "Far" and "Near" are defined. The "Far" indicates the SubIDC 12, SubIDC 13, or SubIDC 14, whereas the "Near" indicates the IDC 11.

The interface ID is an ID which is provided to each interface in the case where an interface connected to an IDC is determined to be a resource. The interface type indicates the kind of an interface inputted to the IDC.

In the example shown in FIG. 8B, a resource (here IDC 11) of resource ID "2" has a device ID of "1.1.0.0", an IDC type of "ROOT", i.e., IDC 11, a distance of "Near" because of the IDC 11. A resource (here SubIDC 13) of resource ID "10" has a device ID of "1.3.1.0", a resource name of "IDC_3", and an interface ID of "1". Its input is "GPI". In other words, a GPI signal is inputted to the SubIDC 13.

FIG. 9 shows an example of description of the IDC_CFS file. In this file, configurations of respective devices are mainly described. In the example shown in FIG. 9, the IDC 11 is (root idc0). The command content is formed by using the timer or the GPI signal (userActive) as a trigger. Furthermore, the SubIDCs 12, 13 and 14 are connected by respective SubIDCs and VSBUSes.

As a feature of the present invention, resources described in the SMS_config file and the IDC_CFS file are displayed on the screen of the SMSGW terminal 6 in a hierarchical form on the basis of user's operation.

Figure 10:
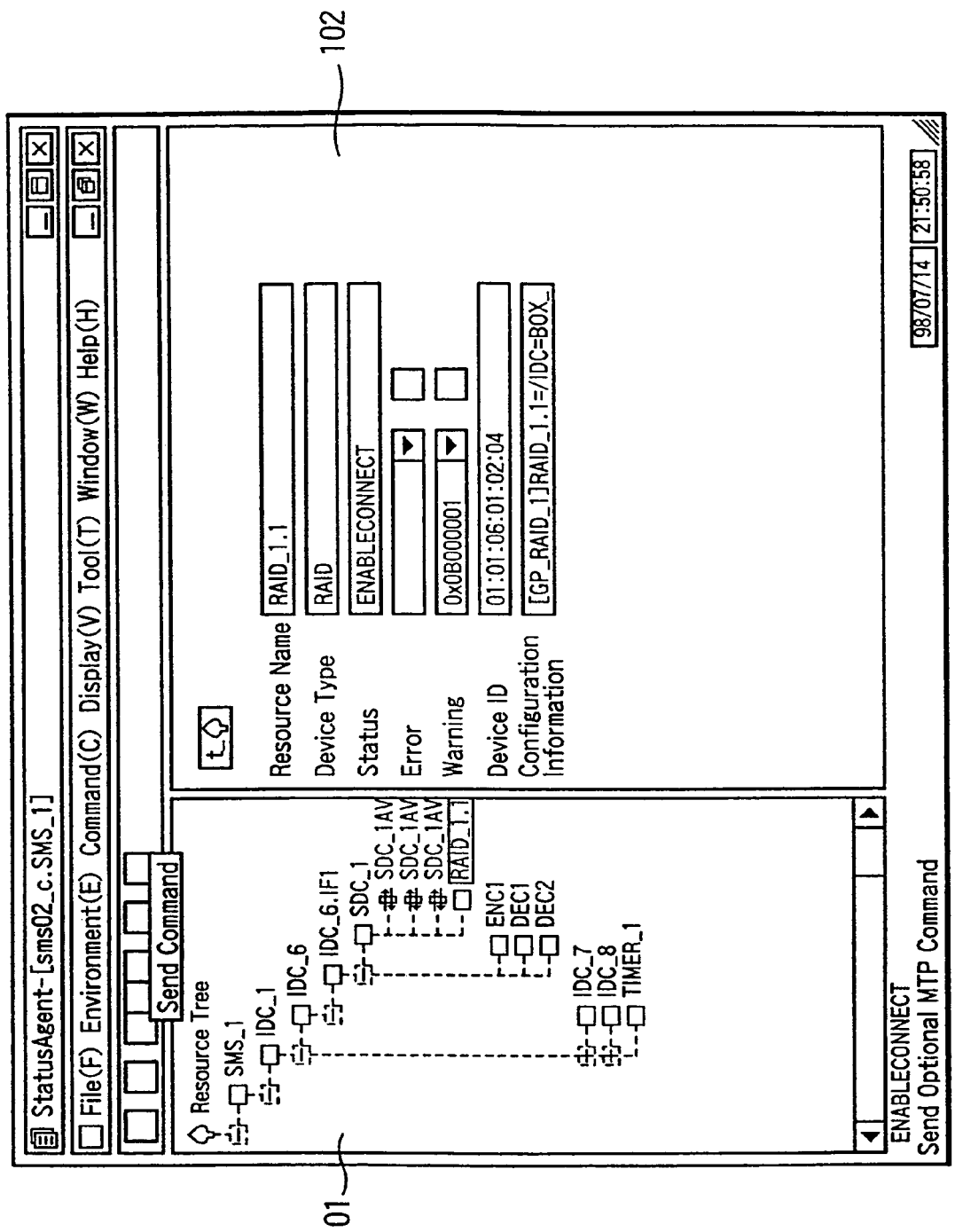
FIG. 10 is a diagram showing an example of a picture of resources displayed on a screen of an operation terminal.
Figure 11:
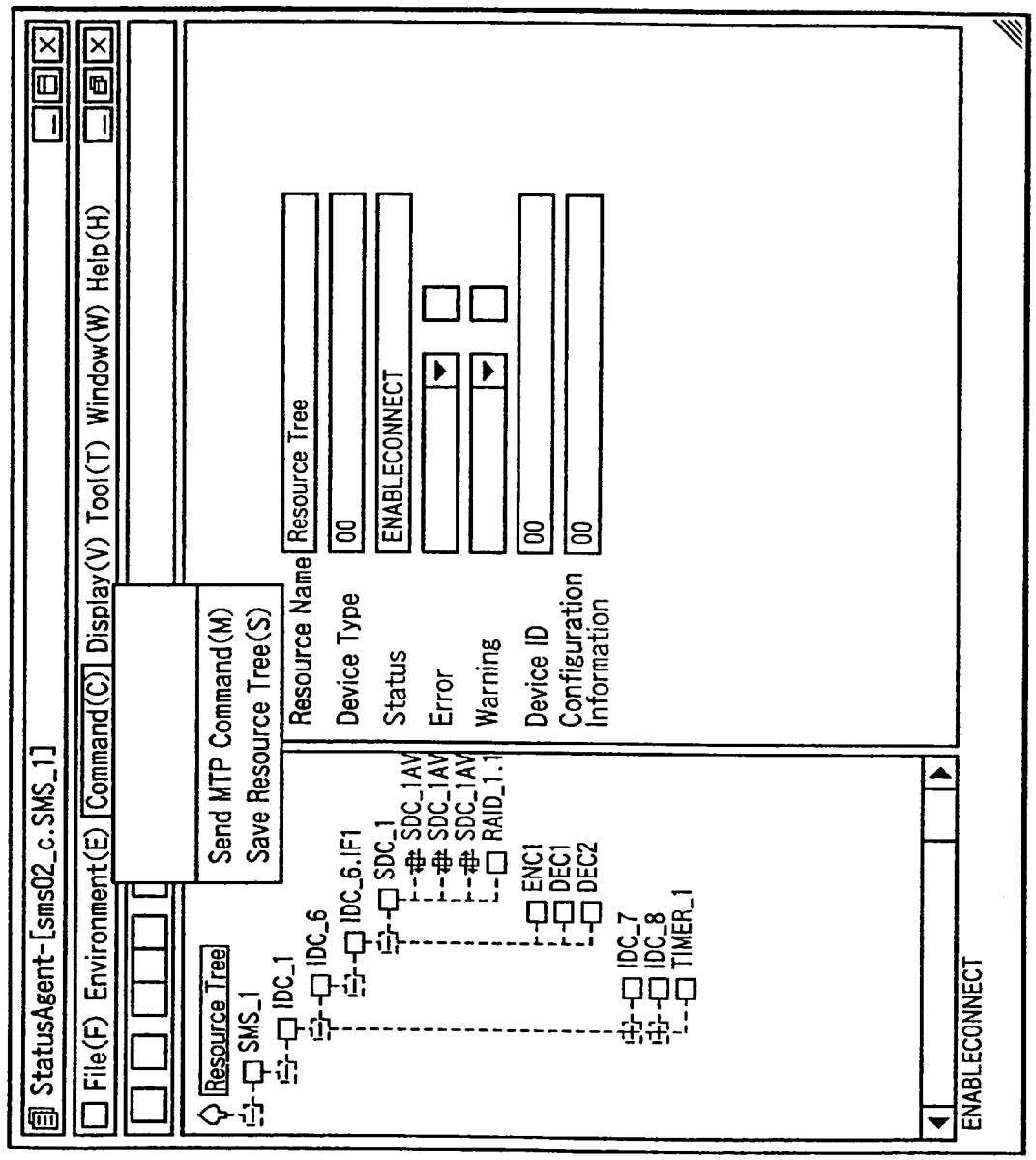
FIG. 11 is a diagram showing an example of a picture of resources displayed on a screen of an operation terminal.

Each of FIGS. 10 and 11 shows an example of a screen display of resources displayed on the operation terminal 1.

The whole resource screen is formed of a resource configuration screen 101 and a fault content detail screen 102.

In the resource configuration screen 101, resources are displayed in a hierarchical form beginning from the SMS/GW terminal 1. It is possible to visually grasp how resources are connected. An example shown in FIG. 10 shows the case where a failure has occurred in the HDD in the RAID. The resource configuration screen 101 shows resources ranging from the SMS terminal 1 belonging to the highest class to the class of a lower RAID in which a failure has occurred. The resource name "RAID_1.1" of the failed HDD is reverse-displayed.

On the right side of the picture, the fault content detail screen 102 is displayed. Together with information concerning the failed resource, contents of the error and warning are displayed.

The fault content detail screen 102 includes a resource name display column 103 for displaying the failed resource name, a resource type display column 104 for displaying a resource type to which the failed resource belongs, a resource state display column 105 for displaying the resource state of the failed resource, an error display column 106 for displaying the error content of the failed resource, a warning display column 107 for displaying the warning content of the failed resource, a device ID display column 108 for displaying the device ID of the failed resource, and a configuration information column 109 for displaying connection configuration information of the failed resource. All of the resource name, resource type, resource state, and device ID are a part of contents of the data base managed by the device information management task 601 of the SMS/GW terminal 1. In the present embodiment, the error content and the warning content displayed in the error display column 106 and the warning display column 107 are an error code and a warning code, respectively.

In the example shown in FIG. 10, a failure occurs in a resource "RAID_1.1", the device type of this resource is "RAID", and the status is "ENABLE.CONNECT". As a matter of fact, an error is not generated, but a warning is displayed. The content of the warning is a content indicated by "0x0B000001". The failed device ID is 1.1.6.1. As for the resource configuration, the failed resource is a resource belonging to a resource group having a resource group name of "GP_RAID_1" according to the configuration information column 109. The resource "RAID_1.1" is connected to "SDC_1" such as the recording and reproducing controller 15d. It is upward connected to "IDC_6" via an interface "IDC_6. IF1" such as SubIDC 12. It is further upward connected to "IDC_1", i.e., IDC11. It is further upward connected to "SMS_1".

On the other hand, FIG. 11 shows an example of display at the time when RAID rebuilding is requested by the AV server section 7. In the same way as FIG. 10, resources are displayed in a hierarchy form. "Resource Tree" located on the top left side of the screen is reverse-displayed to notify the user that a rebuilding request has been issued.

In response to the rebuilding request, the user selects "command (C)" from a menu located on the top of the screen. If the user selects "RAID rebuilding (B)" from its submenu, then a screen for conducting operation for rebuilding by graphical user interface (a screen for interactively ordering operation for rebuilding by using a dialogue box or the like) is displayed. Irrespective of whether the RAID is the SCSI type or the SBX type, this screen urges the same operation.

Although not illustrated, in the case where a fault does not occur in any resource and there are no building requests, resource names of all resources ranging from the SMSGW terminal 6 which is a resource of the highest class down to a resource of the lowest class are displayed in a hierarchical form together with icons.

In the AV server system, the SMSGW terminal 6 and resources of the AV server section 7 are displayed on the screen of the SMSGW terminal 6 in a hierarchical form on the basis of the SMS_Config file and the IDC_CFS file. From this screen display, therefore, the entire structure of the SMSGW terminal 6 and the AV server section 7 can be easily grasped.

Furthermore, the range from the SMSGW terminal 6 which belongs to the highest class down to the class to which the failed resource belongs is displayed on one screen of the SMSGW terminal 6. From this screen display, therefore, it is possible to easily determine which position of the whole of the SMSGW terminal 6 and the AV server section 7 the failed resource is located in. Therefore, it is possible to grasp and cope with the fault rapidly.

Furthermore, the screen for RAID rebuilding operation using the graphical user interface is displayed on the SMSGW terminal 6. During the system running, therefore, the user can easily conduct operation for rebuilding.

Furthermore, Irrespective of whether the RAID is the SCSI type or SBX type, the screen for urging the same operation is displayed as the screen for conducting rebuilding operation. Without being conscious of the kind of the RAID, therefore, the user can conduct operation for rebuilding. In that point as well, operation for rebuilding is further facilitated.

In addition to the screen display of FIGS. 10 and 11, a screen for conducting resource separation, initialization, and enabling operation may be displayed on the SMSGW terminal 6. In the conventional technique, a program and a sequence for conducting resource separation, initialization, and enabling operation are produced for each AV server system. This is complicated. Since the screen for conducting these operations is displayed on the SMSGW terminal 6, therefore, it becomes possible for the user to easily conduct these operations as well.

In the superimposition generating terminal 5 of FIG. 1, data to be superimposed on the AV data outputted from the AV server section 7 is generated. As a feature of the present invention, the superimposition generating terminal 5 outputs superimposition data generated at such timing that a timing signal was supplied the last time, at such timing that the above described timing pulse is supplied from the upper terminal 2. In addition, the superimposition generating terminal 5 acquires information on a material (a material specified by the upper terminal 2 on the basis of the play list, or a material specified by the operator by using the operation terminal 1) to be sent the next time, from the DB terminal 3, and generates superimposition data corresponding to the material.

The character data outputted from the superimposition generating terminal 5 is combined with AV data supplied from the AV server section 7 to the sending section 31 via the output line OUTPUT_A, by the combining circuit 8.

Figure 12:
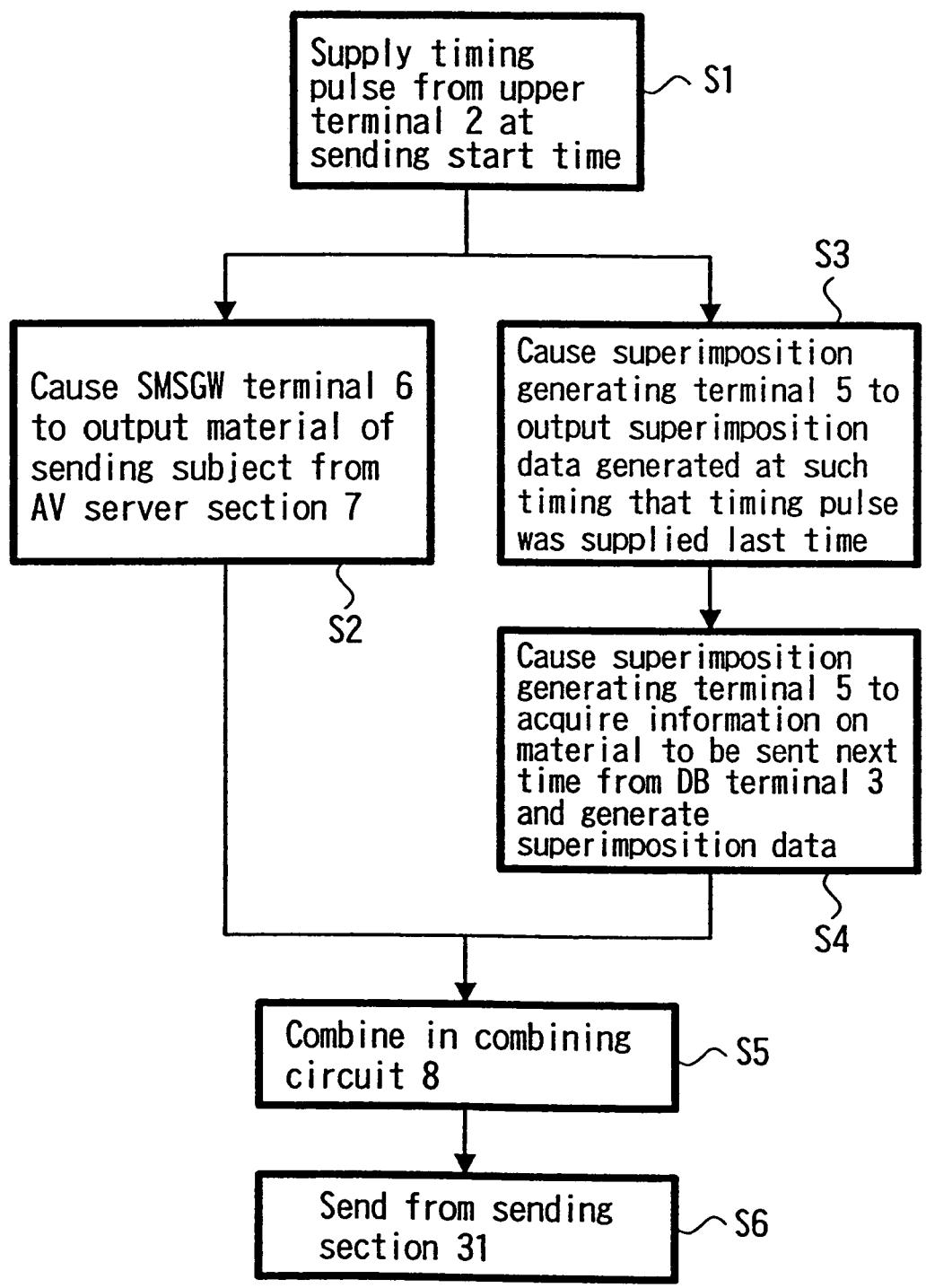
FIG. 12 is a flow chart showing a flow of operation for character data combining in an AV server system.

A flow of operation of combining the character data with the AV data in the AV server system will now be described by referring to FIG. 12.

A timing pulse is supplied from the upper terminal 2 to the SMSGW terminal 6 and the superimposition generating terminal 5 at every sending start time of the material (time specified by the upper terminal 2 on the basis of the play list, or time specified by the operator at the operation terminal 1) (step S1).

At such timing that the timing pulse is supplied, the SMSGW terminal 6 outputs a material of sending subject (a material specified by the upper terminal 2 on the basis of the play list, or a material specified by the operator by using the operation terminal 1) from the AV server 7, according to the above described series of operation (step S2).

On the other hand, at such timing that the timing pulse is supplied, the superimposition generating terminal 5 outputs superimposition data generated at such timing that the timing signal was supplied the last time (superimposition data generated at step S4 of FIG. 12 when the timing signal was supplied the last time) (step S3). Furthermore, at such timing that the timing pulse is supplied, the superimposition generating terminal 5 acquires information on a material to be sent out the next time, from the DB terminal 3, and generates superimposition data corresponding to the material (step S4). In other words, superimposition data corresponding to the material to be sent out this time is outputted from the superimposition generating terminal 5 at the step S3.

The superimposition data outputted from the superimposition generating terminal 5 is combined by the combining circuit 8 with the material outputted from the AV server section 7 and supplied to the sending section 31 (step S5). As a result, the material subjected to superimposing is sent out from the sending section 31 (step S6).

Figure 13:
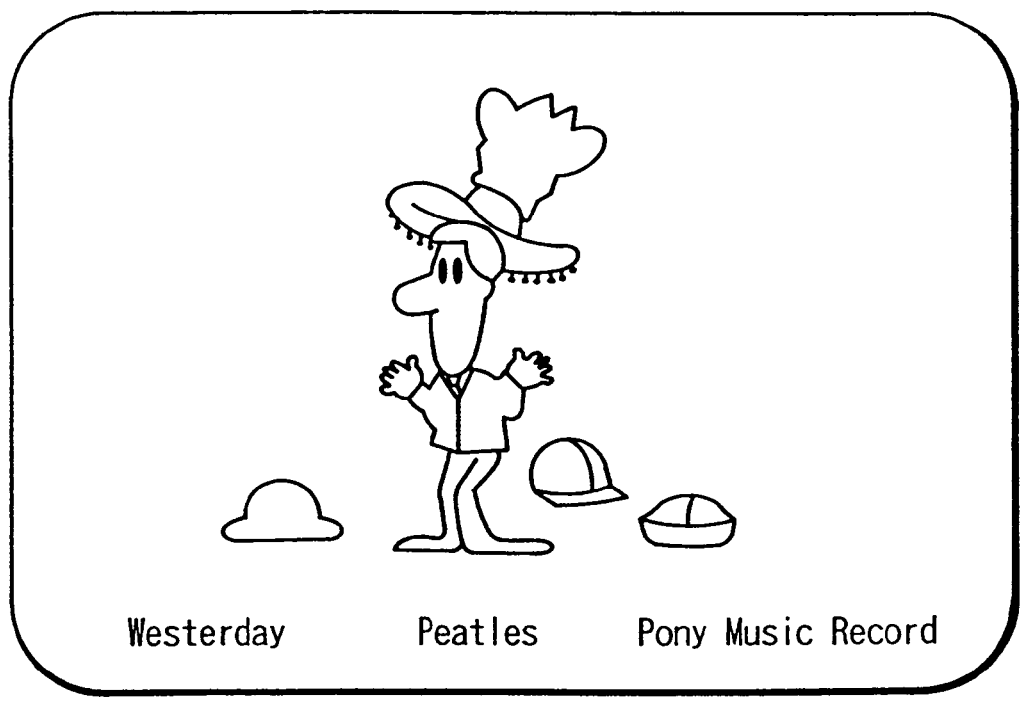
FIG. 13 is a diagram showing an example of a picture of a material sent out from a sending section, displayed on a screen.

FIG. 13 shows an example of a screen display of the material thus sent out from the sending section 31. This example is a program which sends out AV data on one piece of music (audio data obtained by recording performance of the music and video data on the image video of the artist for the music). On the video data on the artist, character data representing the music name "Westerday", the artist name "Peatles", and the record company name "Pony Music Record" are superimposed so as to coincide in timing with the start of the music.

In the AV server system, superimposition data corresponding to the material is generated immediately before the material sending (at sending start time of a material immediately before the material). The superimposition data corresponding to the material is combined with the material so as to coincide in timing with the sending start of the material. Thus superimposing is conducted.

As a result, the number of man-hours for superimposing is substantially decreased as compared with the case where superimposing is conducted in the editing stage as in the conventional technique. Accordingly, the cost and labor are substantially decreased.

Since the number of man-hours is substantially decreased, the time required until the superimposed material can be sent is substantially shortened. It becomes possible to output the superimposed material rapidly.

Furthermore, the superimposition data corresponding to the material is generated immediately before the material sending (at sending start time of a material immediately before the material). Even when the sending order of the material is altered (even when the play list is altered or the operator alters specification at the operation terminal 1), therefore, it can be coped with flexibly until immediately before the sending.

Therefore, the cost and labor for superimposing can be reduced. In addition, superimposing can be conducted while making the most of the advantage of the AV server that sending of a recorded material can be started rapidly and the advantage of the AV server that the sending order of recorded materials can be arbitrarily altered.

In the AV server system heretofore described, an AV server having a recording and reproducing section which adopts the RAID technique is used. However, the present invention may be applied to an AV server system using an AV server for recording AV data in the HD without adopting the RAID technique and an AV server for recording AV data in a non-linear accessible recording medium (for example, a semiconductor memory, a flash memory, or a disc-shaped recording memory such as a DVD or a MO) other than HDs.

In the example heretofore described, the present invention is applied to the AV server system formed of a plurality of terminals and AV servers. However, the present invention may be applied to an apparatus which implements the function of the AV server system by itself.

Furthermore, the present invention may also be applied to a recording and reproducing apparatus for managing resource describing files as a data base other than an AV server system.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A superimposing apparatus comprising:
   material reproducing means including reproducing means for reproducing a material containing video and/or sound data from a nonlinear accessible recording medium, and a plurality of output processing means for receiving said material reproduced by said reproducing means in an assigned time slot interval and outputting said material to outside;
   superimposition information generating means for generating superimposition information including letter data or character data to be inserted in an image of said material;
   control means for controlling reproducing operation of said material in said material reproducing means;
   timing pulse generating means for generating a timing pulse to be used to insert said superimposition information in said material, said timing pulse being supplied to said control means and said superimposition information generating means; and
   combining means for receiving said material reproduced and outputted from said material reproducing means controlled by said control means according to said timing pulse, and said superimposing information outputted from said superimposition information generating means according to said timing pulse, combining an image of said material with said superimposing information, and outputting a resultant image,
   wherein the timing pulse is generated at every sending start time of the material.

2. A superimposing method for combining superimposition information with a video material, said superimposing method comprising:
   generating said superimposition information;
   outputting said generated superimposition information and generating a timing pulse for outputting material including video data recorded in a non-linear accessible recording medium;
   in response to receiving the timing pulse, causing a reproducing means to reproduce said material from said recording medium and output said material to the outside, and in addition, output said superimposition information;
   combining said output superimposition information with the video material included in said output material; and
   generating the timing pulse at every sending start time of the material.

3. A method for combining superimposition information with video material, comprising:
   generating superimposition information in response to receiving a timing pulse;
   in response to receiving a subsequent timing pulse, outputting the superimposition information, outputting a video material, acquiring information on a subsequent video material and generating subsequent superimposition information associated therewith;
   combining the outputted superimposition information with the outputted video material; and
   generating the timing pulse at every sending start time of the material.

4. An apparatus for combining superimposition information with video material, comprising:

timing pulse generating means to provide a timing pulse and a subsequent timing pulse;

material reproducing means, coupled to the timing pulse generating means, to provide video material in response to receiving the subsequent timing pulse;

superimposition information generating means, coupled to the timing pulse generating means, to generate superimposition information in response to receiving the timing pulse and to output the superimposition information in response to receiving the subsequent timing pulse; and combining means to receive and combine the video material and the superimposition information, wherein, in response to receiving the subsequent timing pulse, the superimposition information generating means acquires information on a subsequent video material and generates a subsequent superimposition information associated therewith, and wherein the timing pulse is generated at every sending start time of the material.

* * * * *